United States Patent [19]

Ballard et al.

[11] Patent Number: 4,566,270
[45] Date of Patent: Jan. 28, 1986

[54] GAS TURBINE ENGINE INFRA-RED RADIATION SUPPRESSOR

[75] Inventors: John R. Ballard, Sarratt; Peter H. Timmis; Michael J. Buller, both of Kings Langley, all of England

[73] Assignee: Rolls-Royce Limited, London, England

[21] Appl. No.: 671,336

[22] Filed: Nov. 14, 1984

Related U.S. Application Data

[63] Continuation of Ser. No. 433,876, Oct. 13, 1982, abandoned.

[30] Foreign Application Priority Data

Nov. 3, 1981 [GB] United Kingdom ............. 8133087

[51] Int. Cl.⁴ ............................................. F02C 7/18
[52] U.S. Cl. ........................................ 60/264; 60/266; 60/269; 60/271; 60/39.5; 239/127.3; 239/265.17
[58] Field of Search ............ 60/264, 265, 266, 39.5, 60/271, 269; 239/127.3, 265.17, 265.19

[56] References Cited

U.S. PATENT DOCUMENTS

| | | | |
|---|---|---|---|
| 3,087,303 | 4/1963 | Heinze et al. | 239/265.25 |
| 3,174,282 | 3/1965 | Harrison | 239/265.17 |
| 3,174,709 | 3/1965 | Alderson | 239/265.25 X |
| 3,206,929 | 9/1965 | Marchant et al. | 60/229 |
| 3,210,934 | 10/1965 | Smale | 60/265 |
| 3,579,993 | 5/1971 | Tanner et al. | 60/264 X |
| 3,611,726 | 10/1971 | Medawar | 60/264 |
| 3,807,662 | 4/1974 | Velazquez | 239/265.19 X |
| 3,815,360 | 6/1974 | Wellinitz | |
| 3,910,375 | 10/1975 | Hache et al. | 60/262 X |
| 3,981,448 | 9/1976 | Demogenes et al. | 60/265 X |
| 4,007,587 | 2/1977 | Banthin et al. | 60/271 X |
| 4,018,046 | 4/1977 | Hurley | 60/264 |
| 4,066,214 | 1/1978 | Johnson | 60/271 X |
| 4,095,417 | 6/1978 | Banthin | 60/39.5 |
| 4,200,252 | 4/1980 | Logan et al. | 244/130 X |
| 4,215,537 | 8/1980 | Hurley | 60/264 |
| 4,288,984 | 9/1981 | Bhat et al. | 60/226.1 X |
| 4,291,530 | 9/1981 | Ballard | 60/39.092 |
| 4,295,332 | 10/1981 | Steyer et al. | 60/264 |
| 4,312,480 | 1/1982 | Miller | 60/264 X |

FOREIGN PATENT DOCUMENTS

| | | | |
|---|---|---|---|
| EP36643 | 9/1981 | European Pat. Off. | 60/264 |
| 1028041 | 5/1966 | United Kingdom . | |
| 1045295 | 10/1966 | United Kingdom . | |
| 1601807 | 11/1981 | United Kingdom . | |

Primary Examiner—Carlton R. Croyle
Assistant Examiner—Jeffrey A. Simenauer
Attorney, Agent, or Firm—Cushman, Darby & Cushman

[57] ABSTRACT

A gas turbine engine infra-red radiation suppressor comprising an exhaust nozzle which is surrounded by a duct having a plurality of diffuser vanes at its downstream end. The exhaust nozzle and duct constitute an ejector which is powered by the exhaust efflux from the exhaust nozzle and draws ambient air into the duct through a gap between the exhaust nozzle and the duct. The air serves to cool the exhaust efflux and thereby reduce its infra-red radiation emission, and the diffuser vanes prevent direct line of sight of the hot exhaust nozzle.

5 Claims, 2 Drawing Figures

GAS TURBINE ENGINE INFRA-RED RADIATION SUPPRESSOR

This is a continuation of application Ser. No. 433,876, filed Oct. 13, 1982, now abandoned.

This invention relates to a gas turbine engine infra-red radiation suppressor.

The exhaust efflux and externally visible turbine components of a gas turbine engine constitute a source of infra-red radiation which makes the engine, and consequently the aircraft which it powers, vulnerable to attack from infra-red radiation seeking missiles. It is often desirable therefore to provide gas turbine engines with some means for reducing their infra-red "signature" so as to reduce their vulnerability to missile attach. Various devices have been suggested to provide such infra-red radiation reduction but most have drawbacks which make their use undesirable.

For instance, one type of device relies on the provision of air cooled vanes in the engine exhaust efflux which form ejector nozzles. These vanes prevent direct sight of the hot components of the turbine but require very complex and intense cooling systems which tend to be heavy. Other types rely on the positioning of a large cooled body in the engine exhaust efflux to prevent direct sight of the hot turbine components. Such bodies are undesirable in view of the large area which requires cooling and the drag which they impose upon the exhaust efflux, both of which mean high losses in engine power.

It is an object of the present invention to provide a lightweight gas turbine infra-red suppressor which provides effective suppression of infra-red radiation without resort to cooled screening bodies or vanes and consequently provides only a modest loss in engine power.

According to the present invention, a gas turbine engine infra-red radiation suppressor comprises an exhaust nozzle, a duct surrounding said nozzle and extending downstream thereof, and diffuser means positioned at the downstream end of said duct to diffuse any gas flow exhausted from said duct and additionally prevent direct line of sight of said nozzle from the downstream end of said duct, said duct being outwardly spaced apart from said nozzle to define a gap therebetween so that together they define an ejector which is driven by the exhaust efflux issued in operation from said nozzle and draws ambient air into said duct through said defined gap, said nozzle being so shaped as to facilitate rapid mixing of said exhaust efflux and the air drawn through said gap and into said duct.

At least a portion of the periphery of said exhaust nozzle is preferably circumferentially convoluted in order to facilitate said rapid mixing of said exhaust efflux and said air drawn through said gap.

Said duct may be of generally square cross-sectional shape.

Said diffuser means may be constituted by a plurality of vanes.

Said nozzle may be assymmetrical.

At least a portion of said exhaust nozzle may be provided with a thermally insulating coating in order to reduce the amount of infra-red radiation emmitted thereby.

Means are preferably provided to mask at least a portion of said nozzle from direct line of sight through said defined gap between said nozzle and said duct.

The invention will now be described, by way of example, with reference to the accompanying drawings in which.

Figure 1:
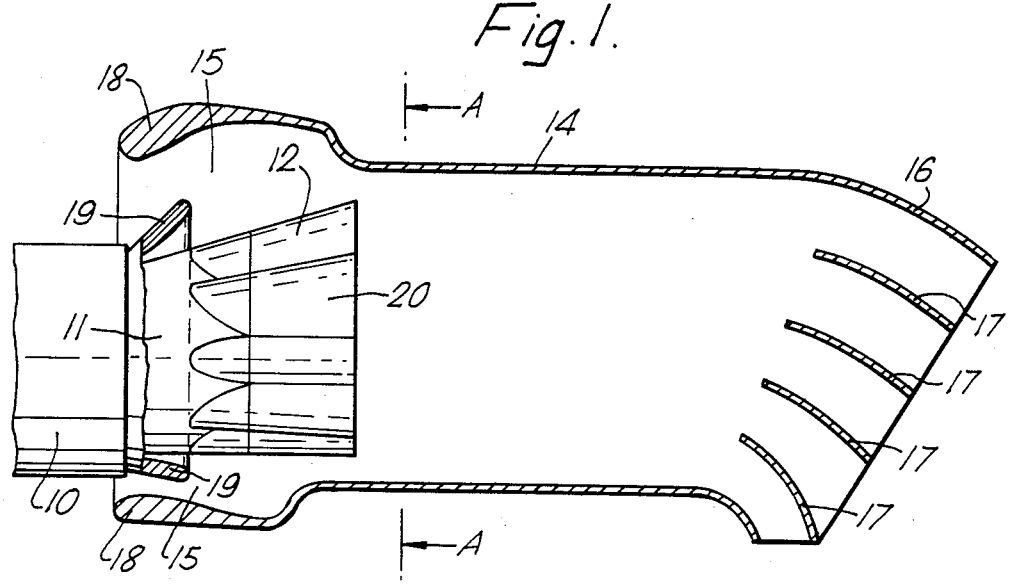
FIG. 1 is a partially sectioned side view of a gas turbine engine infra-red radiation suppressor in accordance with the present invention.
Figure 2:
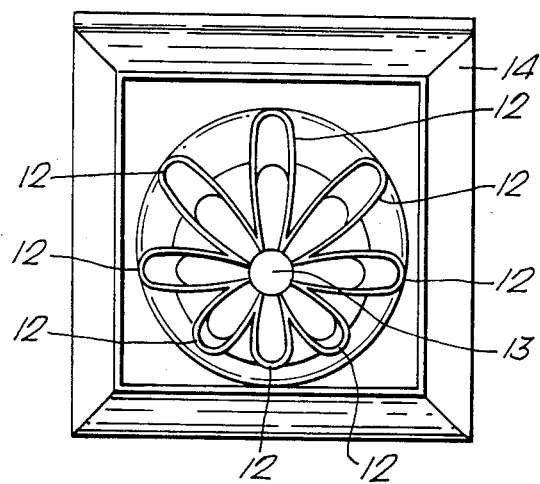
FIG. 2 is a view on line A—A of FIG. 1.

With reference to FIG. 1, a gas turbine engine, 10 the rear portion only of which can be seen in the drawing, is provided with a convergent exhaust nozzle 11. The periphery of the downstream end of the nozzle 11 is circumferentailly convoluted to define light lobes 12 as can be seen in FIG. 2. The lobes 12 are all interconnected at their radially inner ends by a circular plate 13 so that the exhaust efflux from the nozzle 11 must pass through the lobes 12.

The gas turbine engine 10 is intended for mounting on a helicopter fuselage. This being so the convergance of the nozzle 11 is assymmetric in order to permit the engine 10 to be mounted close to the fuselage. It will be appreciated however that if there is no requirement for the engine 10 to be mounted close to the fuselage, then the nozzle 11 could in fact be symmetrically convergent.

The nozzle 11 is surrounded by a generally square cross-section duct 14 which also extends downstream thereof. The duct 14 is outwardly spaced apart from the nozzle 11 so that a gap 15 is defined between them. The downstream end 16 of the duct 14 is slightly curved in order to deflect exhaust gases passing therethrough through away from the helicopter fuselage and also contains a number of vanes 17. The vanes 17 serve three functions. They aid the deflection of exhaust gases away from the helicopter fuselage, they prevent direct line of sight of the nozzle 11 from the downstream end 16 and they act as a diffuser to reduce the velocity and increase the static pressure of gases exhausted from the duct 14.

It will be seen therefore that the exhaust nozzle 11 and the duct 14 together define an ejector which is powered by the exhaust efflux from the exhaust nozzle 11 and which draws ambient air into the duct 14 through the gap 15. The air passes over the exhaust nozzle lobes 12 as it is drawn into the duct 14. The lobes 12 provide rapid mixing of the air with the exhaust efflux from the nozzle 11 so that the exhaust efflux is cooled over a very short length of the duct 14 to such an extent that when it is exhausted from the duct 14, the amount of infra-red radiation it emits is not sufficient to provide a target for an infra-red radiation seeking missile. Indeed that degree of cooling of the exhaust efflux is such that the duct 14 may be fabricated from a composite material such as carbon or glass fibre in a resin matrix and the vanes 17 need not be provided with any form of cooling. The downstream end 16 of the duct 14 thereby exhausts an efflux which is sufficiently cool to not provide an infra-red radiation seeking missile target and, by the provision of the vanes 17, prevents direct line of sight of the hot exhaust nozzle 11 by such a missile.

In order to inhibit direct line of sight of the hot exhaust nozzle 11 through the gap 15 between the nozzle 11 and the duct 14, the upstream end 18 of the duct 14 is shaped to cooperate with an assymmetric collar 19 provided on the downstream end of the engine 10 so as to provide a certain degree of masking of the exhaust nozzle 11. However since the upstream duct end 18 and the collar 19 do not provide full masking of the exhaust nozzle 11, the portion of the exhaust nozzle 11 which is still visible, i.e. the downstream end thereof, is provided with a coating 20 of a thermal barrier material, such as a ceramic or is double skinned in order to reduce the amount of infra-red radiation emmitted thereby.

The present invention therefore provides a gas turbine engine infra-red radiation suppressor which both reduces the temperature of the exhaust efflux of the engine to levels which are not sufficient to provide a target for infra-red radiation seeking missiles and masks the hot parts of the engine 10 from direct line of sight of such a missile. Moreover by cooling the exhaust efflux from the nozzle 11 by ambient air drawn in through the gap 15, and providing only diffuser vanes 17 in the path of the exhaust efflux, infra-red radiation suppressors in accordance with the present invention incur only a modest loss of engine power.

We claim:

1. A gas turbine engine infra-red radiation suppressor comprising:
   a circumferentially convoluted exhaust nozzle defining lobes and having a downstream end for discharge of an exhaust efflux;
   a duct having an upstream end surrounding and extending upstream of said downstream end of said circumferentially convoluted exhaust nozzle, said duct extending downstream of said circumferentially convoluted exhaust nozzle and terminating in a downstream end, said upstream end of said duct being in spaced relationship to said circumferentially convoluted exhaust nozzle to define a gap for drawing of ambient air into said duct for rapid mixing with said exhaust efflux discharged from said circumferentially convoluted exhaust nozzle;
   diffuser means positioned in said duct immediately adjacent the downstream end of said duct for diffusing said air and said exhaust efflux flowing from said duct, said diffuser means including a plurality of uncooled vanes extending across the downstream end of said duct, said vanes having upstream ends spaced a sufficient distance downstream of said downstream end of said convoluted exhaust nozzle to permit the rapid mixing of exhaust efflux from said exhaust nozzle and ambient air in said duct, said vanes further being arranged to prevent an axial direct line of sight of said circumferentially convoluted exhaust nozzle from said downstream end of said duct; and
   means shielding a portion of said circumferentially convoluted exhaust nozzle from a direct line of sight through said gap between said circumferentially convoluted exhaust nozzle and said duct.

2. A gas turbine engine infra-red radiation suppressor as claimed in claim 1 wherein said duct has a generally square cross-sectional shape.

3. A gas turbine engine infra-red radiation suppressor as claimed in claim 1 wherein said nozzle is asymmetrical.

4. A gas turbine engine infra-red radiation suppressor as claimed in claim 1 wherein at least a portion of said exhaust nozzle which is axially visible through said gap is provided with a thermally insulating coating in order to reduce exterior temperature of said nozzle and the amount of infra-red radiation emitted thereby through said gap.

5. A gas turbine engine infra-red radiation suppressor as claimed in claim 1 wherein said means shielding said circumferentially convoluted exhaust nozzle from a direct line of sight through said gap between said circumferentially convoluted exhaust nozzle and said duct includes an annular collar diverging outwardly in a downstream direction from said circumferentially convoluted exhaust nozzle, said collar having a downstream edge extending at least outwarding a sufficient distance to shield said circumferentially convoluted exhaust nozzle from the direct line of sight through said gap.

* * * * *